Figure 1:
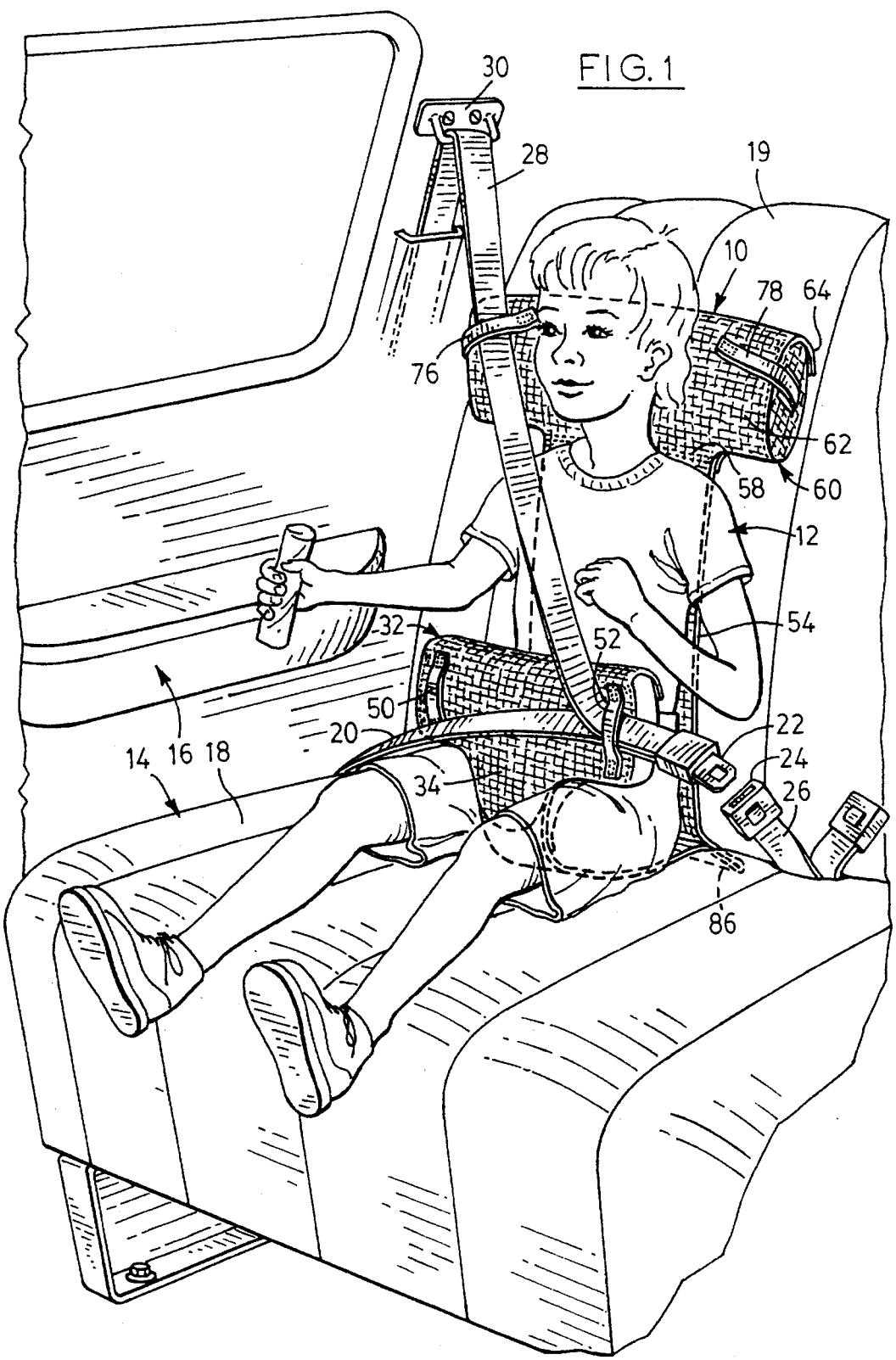

United States Patent [19]

Scime

[11] Patent Number: 5,468,020
[45] Date of Patent: Nov. 21, 1995

[54] AUXILIARY SAFETY HARNESS

[76] Inventor: Danya Scime, 2780, Dunmark Road, Alberton, Ontario, Canada, L0R 1A0

[21] Appl. No.: 316,496

[22] Filed: Sep. 30, 1994

[51] Int. Cl.⁶ ................................................. B60R 22/00
[52] U.S. Cl. ................ 280/808; 280/801.1; 297/216.11; 297/219.12
[58] Field of Search .................................. 280/751, 748, 280/801.1, 808; 297/467, 468, 483, 488, 216.11, 250.1, 219.12

[56] References Cited

U.S. PATENT DOCUMENTS

| | | | |
|---|---|---|---|
| 1,376,625 | 5/1921 | Johnston | 297/219.12 |
| 2,853,339 | 9/1958 | Lazarus | 280/751 X |
| 3,767,259 | 10/1973 | Blake et al. | 297/488 X |
| 3,929,349 | 12/1975 | Schubert | 280/751 |
| 4,695,092 | 9/1987 | Hittie | 297/219.12 |
| 5,026,115 | 6/1991 | Barnes | 297/488 X |
| 5,080,441 | 1/1992 | Stevensen et al. | 297/488 |
| 5,137,335 | 8/1992 | Marten | 297/485 |

*Primary Examiner*—Margaret A. Focarino
*Assistant Examiner*—Christopher Ellis
*Attorney, Agent, or Firm*—Rogers & Scott

[57] ABSTRACT

An auxiliary safety harness, suitable for use by a child sitting on a vehicle seat provided with a releasable lap belt, has a pelvic guard positionable to extend laterally across the front pelvic area of the child and a portion which extends downwardly between the child's legs. The pelvic guard has at least one retainer loop through which the lap belt can pass to retain the pelvic guard in position when the lap belt is fastened. A flexible connecting portion extends from the downwardly extending portion of the pelvic guard to an upper end portion whereby, in use, the flexible connecting portion can be positioned to extend between the child's bottom and the vehicle seat and upwardly between the child's back and the back part of the seat. The upper end portion can be releasably secured to the back part of the seat.

10 Claims, 3 Drawing Sheets

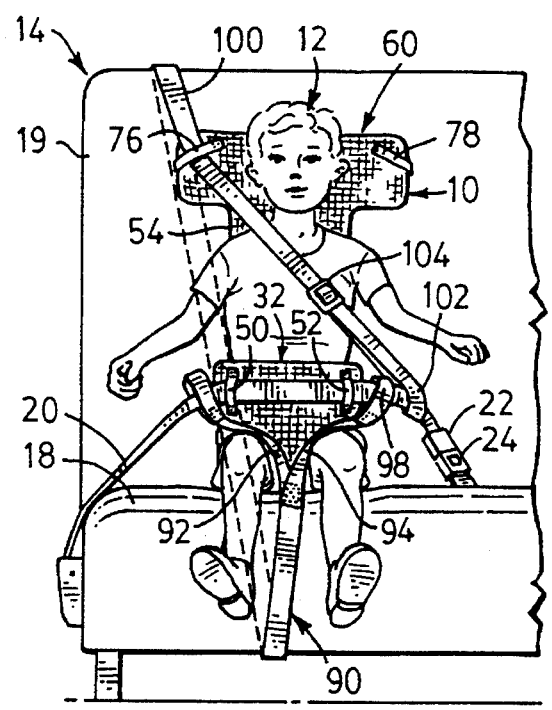

AUXILIARY SAFETY HARNESS

The present invention relates to auxiliary safety harnesses suitable for use by children sitting on a vehicle seat provided with a releasable lap belt and possibly also with a diagonally extending shoulder belt.

Most present day private passenger vehicles are provided with at least lap belts for all passengers and some seat positions are also provided with diagonally extending shoulder belts. Various auxiliary safety harnesses particularly intended for use by children have been proposed for use with conventional safety belts already provided in a vehicle. However, for one reason or another, most known auxiliary safety harnesses have not proved to be particularly satisfactory in practice.

It is therefore an object of the invention to provide an improved auxiliary safety harness for use by children in association with a conventional lap belt and possibly also a diagonal shoulder belt provided in a vehicle to retain a person in their seat in an emergency.

According to the present invention, an auxiliary safety harness comprises a pelvic guard positionable to extend laterally across the front pelvic area of the child and having a portion which extends downwardly between the child's legs, said pelvic guard having at least one retainer loop through which the lap belt can pass to retain the pelvic guard in position when the lap belt is fastened, a flexible connecting portion extending from the downwardly extending portion of the pelvic guard to an upper end portion whereby, in use, the flexible connecting portion can be positioned to extend between the child's bottom and the vehicle seat and upwardly between the child's back and the back part of the seat, and said upper end portion having releasable securing means to enable the upper end portion to be releasably secured to the back part of the seat.

The pelvic guard may comprise a readily openable pouch containing a cushioned insert. The cushioned insert may comprise a rigid sheet-like core surrounded by resilient cushioning material. The core and cushioning material may be contained within a waterproof cover of material which is readily cleanable by wiping.

The upper end portion may comprise a head rest. The head rest may comprise a readily openable pouch containing a cushioned insert. The cushioned insert may comprise a rigid sheet-like core surrounded by resilient cushioning material. The core and cushioning material may be contained within a waterproof core of material which is readily cleanable by wiping.

The head rest may have at least one retainer loop through which a conventional diagonal shoulder belt provided with the vehicle seat can pass to retain the shoulder belt in a desired position relative to the head rest.

The auxiliary safety harness may also include an auxiliary strap with a Y-shaped configuration at one end, said one end having a loop on each Y-portion through which the lap belt can pass, and an elongated main portion which can pass forwardly from the child downwardly over the seat, underneath the seat and upwardly behind the seat to then pass downwardly across the front of the child in a similar manner to a conventional shoulder belt, the main strap portion having a loop at its opposite end through which the lap belt can pass to retain the main strap portion in position across the front of the child.

Figure 2:
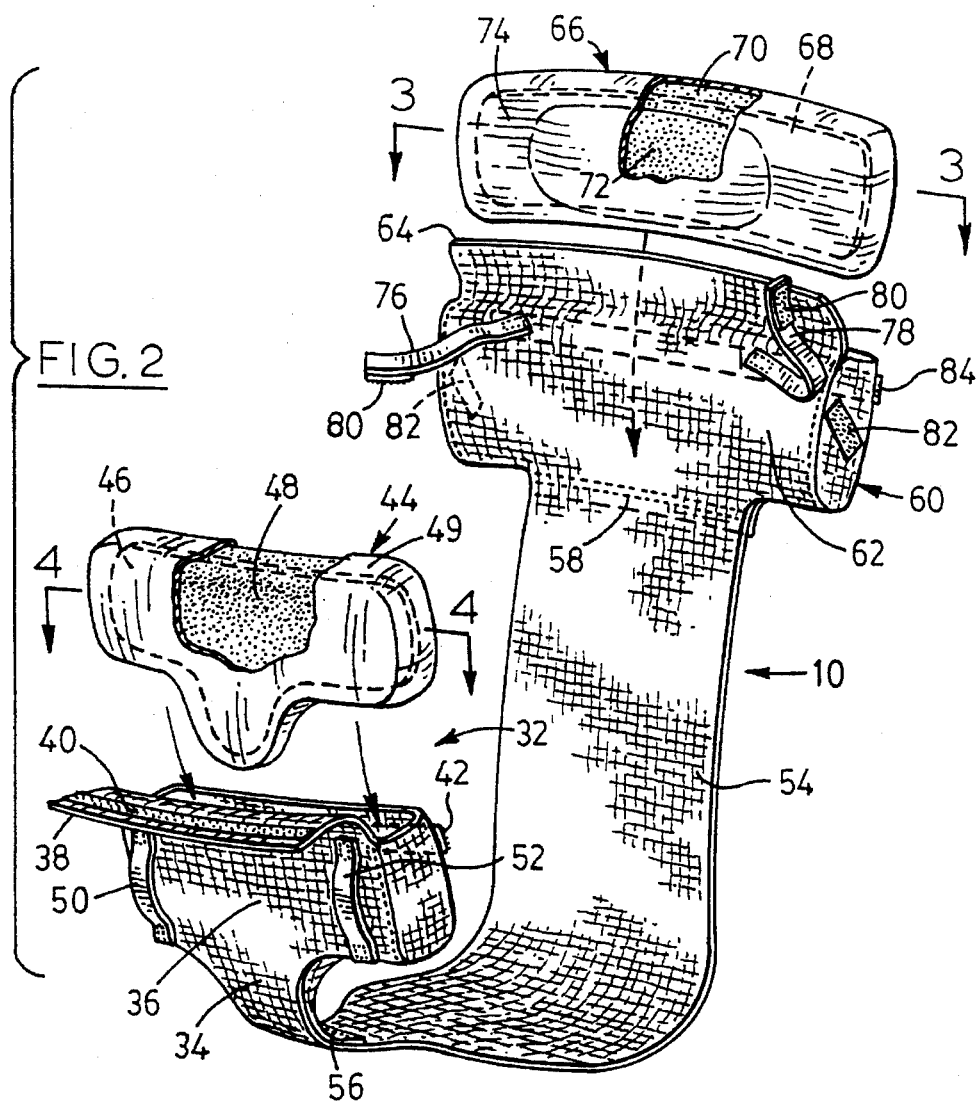
Figure 3:
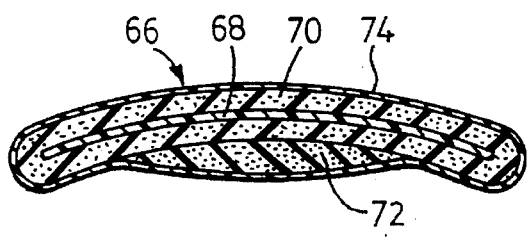
Figure 4:
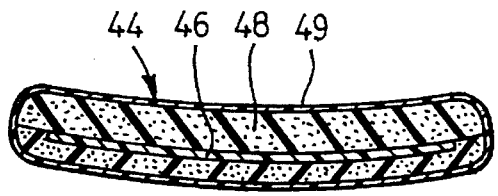

Embodiments of the invention will now be described, by way of example, with reference to the accompanying drawings in which:

FIG. 1 is a perspective view of a child sitting on a vehicle seat provided with conventional lap and shoulder belts and using an auxiliary safety harness in accordance with one embodiment of the invention, FIG. 2 is a partly exploded perspective view of the auxiliary safety harness, FIG. 3 is a sectional view along the line 3—3 of FIG. 2, FIG. 4 is a similar view along the line 4—4 of FIG. 2, FIG. 5 is a front view of a child sitting on a vehicle seat provided only with a conventional lap belt and using an auxiliary seat harness in accordance with a second embodiment of the invention, and FIG. 6 is a plan view of the additional safety strap provided with the embodiment shown in FIG. 5.

Referring first to FIGS. 1 to 4, an auxiliary safety harness 10 in accordance with a first embodiment of the invention is provided for use by a child 12 sitting on a seat 14 in a vehicle 16 (only a portion of which is shown). The seat 14 has a seat part 18 and a back part 19. The seat 14 is provided with a conventional lap belt 20 extending from a housing (not shown) secured to the vehicle 16, the lap belt 20 extending across the child's portion of the seat 14 from one end thereof and having a connector 22 releasable securable in a complementary connector 24 on one end of a short belt 26 whose other end (not shown) is secured to an anchor beneath the seat at the rear. The seat 14 is also provided with a conventional shoulder belt 28 which extends upwardly from a housing (not shown) secured to the vehicle 16 through a guide 30 secured to the vehicle wall and then downwardly to the lap belt connector 22, the shoulder belt 28 being attached thereto. The housings from which the unseen ends of the lap belt 20 and shoulder belt 28 extend may be of the kind which have roll-up mechanisms which retain substantial portions of the lengths of the belts 20, 28 when they are not in use.

The auxiliary safety harness 10 comprises a generally T-shaped pelvic guard 32 which is positioned to extend laterally across the front pelvic area of the child 12 sitting on the seat 14. The pelvic unit 32 also has a central downwardly projecting portion 34 which extends downwardly between the child's legs. The pelvic guard 32 comprises a generally T-shaped pouch 36 of suitable fabric material and having a top flap 38 which can be secured in the closed position by means of a first Velcro strip 40 on the flap 38 and a second Velcro 42 on the main body of the pouch 36. The pouch 36 contains a generally T-shaped cushioned insert 44 (see FIGS. 2 and 4) which comprises a slightly curved rigid plastic sheet-like core 46 surrounded by plastic foam 48. The core 46 and foam 48 are contained within a waterproof cover 49 which is readily clear, able by wiping. The pouch 36 has two laterally spaced loops 50, 52, the purpose of which will be explained later.

The fabric material forming the lower part of the pouch 36 is connected to one end of an elongated flexible connecting portion 54, for example by stitching 56. The other end of the connecting portion 54 is secured, for example by stitching 58, to the bottom of a neck support 60. The neck support 60 also comprises a pouch 62 of suitable fabric material and has a top flap 64 releasably securable to the main body of the pouch 62 by Velcro in a manner similar to the top flap 38 of pouch 36. It will be noted that the neck support 60 projects laterally beyond opposite sides of the connecting portion 54.

The pouch 62 contains a cushioned insert 66 (see FIGS. 2 and 3) which comprises a slightly curved rigid plastic sheet-like core 68 surrounded by plastic foam 70 with a further plastic foam cushion 72 at the front. The core 68 and foam 70, 72 are contained within a waterproof cover 74 which is readily cleanable by wiping.

The pouch 62 has two releasably laterally spaced loops 76, 78, each having one end permanently secured to the pouch 62 and an opposite end releasably securable thereto by Velcro strips 80, 82 on the loop 78 and pouch 62 respectively. The pouch 62 also has a Velcro strip 84 at the rear to enable the neck support 60 to be releasably secured to the back part 19 of the seat 14.

In use, the auxiliary safety harness is positioned on the seat 14 with the pelvic guard 32 resting on the seat part 18 and the neck support 60 attached by the Velcro strip 84 to the back part 20 at the height of the neck of the child 12 (who is not yet on the seat). Any surplus length of connecting portion 54 is pushed between the seat part 18 and back part 20, as shown at 86 in FIG. 1. The child 12 is then placed on the seat 14 as shown in FIG. 1, and the pelvic guard 32 is pulled up between the child's legs so that the major portion of the pelvic guard 32 extends across the child's front pelvic area and the central lower portion 34 is located between the child's legs. As shown, the child's head rests on the head rest 60.

The loop 76 on the head rest 60 is released and the connector 22 of the conventional seat harness is inserted through the loop 52 on the pelvic guard 32 and attached in the usual manner to the connector 24. The loop 76 is then passed over the front of the shoulder belt 28 and re-secured to the Velcro attachment 82.

As can be clearly seen from FIG. 1, the child's pelvic area is well protected by the pelvic guard 32 and the head rest 60 not only provides a comfortable support for the head but also provides a guide (loop 76) for the diagonal belt 28. The auxiliary safety harness can of course be released by reversing the harnessing procedure just described. It will be noted that it is very easy to remove the child from the harness in an emergency by simply releasing connector 22 and pulling the connector rearwardly through loop 52.

The passage of the conventional lap and diagonal belts 20, 28 through the loop 52 on the pelvic guard 32 assists in retaining the pelvic guard 32 in position. Also, the passage of the diagonal belt 28 through the loop 52 causes the belt 28 to be more vertical as it passes across the child's body and would otherwise be the case, thereby ensuring that the belt 28 is not too close to the child's neck.

It will be understood that, if the child is to be seated on the other side of the vehicle, the loops 50, 78 would be used instead of the loops 52, 56 for the conventional lap and diagonal belts.

Because of the length of the connecting portion 54, the auxiliary seat harness can be used for children of various ages. The harness can be rolled up into a compact form when not in use, and can readily be used in different vehicles. Also, the inserts 44, 66 can readily be removed from their pouches 36, 62 respectively for cleaning. The pouches 36, 62 and the connecting portion 54 can be made of the same readily washable material.

FIGS. 5 and 6 show an embodiment for use if a conventional diagonal belt is not provided, such as in older vehicles or in the centre position of a seat for three persons. In this embodiment, the previously described auxiliary seat harness 10 is used together with an additional strap 90. The strap 90 has a Y-shaped configuration at one end with Y-portions 92, 94 each having a loop 96, 98 at their free ends. The strap 90 has a main portion 100 of considerable length sufficient to extend from the child's pelvic area forwardly and downwardly around the front of the seat part 18, underneath the seat part 18 and upwardly behind the back part 19, and then downwardly across the front of the child 12 to pelvic level. The main strap portion 100 is doubled back on itself at the opposite end from the Y-shaped end to form a loop 102, the end of the main strap portion 100 carrying a length adjuster 104 of the conventional kind through which the strap is threaded to enable the length of the loop 102 and hence overall length of the strap portion 100 to be adjusted. The main strap portion 100 is first passed beneath the seat 14 and upwardly at the back, and may be left in place if desired.

In use of this embodiment, the conventional lap belt 20 is passed through Y-loop 96, pelvic guard loops 50, 52, Y-loop 98 and end loop 102, and connector 22 is snapped into connector 24. Loop 76 is then secured around main strap portion 100. Thus, main strap portion 100 passes downwardly across the child's chest to function in a similar manner to a conventional diagonal shoulder belt.

The advantages of the invention will be readily apparent from the foregoing description of preferred embodiments. Other embodiments of the invention will be readily apparent to a person skilled in the art, the scope of the invention being defined in the appended claims.

I claim:

1. An auxiliary safety harness suitable for use by a child sitting on a vehicle seat provided with a releasable lap belt, said harness comprising:

a pelvic guard positionable to extend laterally across the front pelvic area of the child and having a portion which extends downwardly between the child's legs, said pelvic guard having at least one retainer loop through which the lap belt can pass to retain the pelvic guard in position when the lap belt is fastened, a flexible connecting portion extending downwardly from the downwardly extending portion of the pelvic guard to an upper end portion whereby, in use, the flexible connecting portion can be positioned to extend between the child's bottom and the vehicle seat and upwardly between the child's back and the back part of the seat, and said upper end portion having releasable securing means to enable the upper end portion to be releasably secured to the back part of the seat.

2. An auxiliary safety harness according to claim 1 wherein the pelvic guard comprises a readily openable pouch containing a cushioned insert.

3. An auxiliary safety harness according to claim 2 wherein the cushioned insert comprises a rigid sheet-like core surrounded by resilient cushioning material.

4. An auxiliary safety harness according to claim 3 wherein the core and cushioning material are contained within a waterproof cover of material which is readily cleanable by wiping.

5. An auxiliary safety harness according to claim 1 wherein the upper end portion comprises a cushioned head rest.

6. An auxiliary safety harness according to claim 5 wherein the head rest comprises a readily openable pouch containing a cushioned insert.

7. An auxiliary safety harness according to claim 6 wherein the cushioned insert comprises a rigid sheet-like core surrounded by resilient cushioning material.

8. An auxiliary safety harness according to claim 7 wherein the core and cushioning material are contained within a waterproof cover of material which is readily cleanable by wiping.

9. An auxiliary safety harness according to claim 5 wherein the head rest has at least one retainer loop through which a conventional diagonal shoulder belt provided with the vehicle seat can pass to retain the shoulder belt in a desired position relative to the head rest.

10. An auxiliary safety harness according to claim 1 also including an auxiliary strap with a Y-shaped configuration at one end, said one end having a loop on each Y-portion through which the lap belt can pass, and an elongated main portion which can pass forwardly from the child downwardly over the seat, underneath the seat and upwardly behind the seat to then pass downwardly across the front of the child in a similar manner to a conventional shoulder belt, the main strap portion having a loop at its opposite end through which the lap belt can pass to retain the main strap portion in position across the front of the child.

* * * * *